US010690120B2

(12) United States Patent
Fraughton et al.

(10) Patent No.: US 10,690,120 B2
(45) Date of Patent: Jun. 23, 2020

(54) CLEANING APPARATUSES

(71) Applicants: Sonny K. Fraughton, Evanston, WY (US); Broque L. Fraughton, Evanston, WY (US); Dustin Jensen, Sandy, UT (US)

(72) Inventors: Sonny K. Fraughton, Evanston, WY (US); Broque L. Fraughton, Evanston, WY (US); Dustin Jensen, Sandy, UT (US)

( * ) Notice: Subject to any disclaimer, the term of this patent is extended or adjusted under 35 U.S.C. 154(b) by 51 days.

(21) Appl. No.: 15/278,135

(22) Filed: Sep. 28, 2016

(65) Prior Publication Data

US 2018/0087490 A1    Mar. 29, 2018

(51) Int. Cl.
*F03D 80/55* (2016.01)
*B08B 3/02* (2006.01)
*B08B 1/00* (2006.01)

(52) U.S. Cl.
CPC ............. *F03D 80/55* (2016.05); *B08B 1/002* (2013.01); *B08B 1/008* (2013.01); *B08B 3/024* (2013.01); *F05B 2240/912* (2013.01); *F05B 2250/71* (2013.01); *F05B 2280/10* (2013.01); *Y02E 10/728* (2013.01)

(58) Field of Classification Search
None
See application file for complete search history.

(56) References Cited

U.S. PATENT DOCUMENTS

| 4,071,919 A * | 2/1978 | Fields | B08B 9/0436 134/167 C |
| 4,962,560 A | 10/1990 | Moore | |
| 5,161,557 A | 11/1992 | Scheiter, Jr. | |
| 5,352,297 A | 10/1994 | Peters | |
| 6,431,224 B1 | 8/2002 | Fry | |

(Continued)

FOREIGN PATENT DOCUMENTS

| JP | 2005211885 | 8/2005 |
| JP | 2008309098 | 12/2008 |

OTHER PUBLICATIONS

International Search Report dated Jul. 20, 2012 for PCT/US2012/031591, Applicant Dustin Jensen.

(Continued)

*Primary Examiner* — Mikhail Kornakov
*Assistant Examiner* — Ryan L. Coleman
(74) *Attorney, Agent, or Firm* — Thorpe North & Western, LLP

(57) ABSTRACT

A cleaning apparatus suitable for cleaning a horizontally curved metal tower can include a fluid directing channel configured to receive pressurized fluid from a fluid source; a slider or wheel positioned to contact and vertically traverse the horizontally curved metal tower; and a standoff which separates the fluid directing channel spatially from the slider or wheel. The apparatus can also include sprayer nozzles fluidly coupled to the fluid directing channel which can be directed toward or beyond the slider or wheel. A magnet can also be positioned on the apparatus that is configured to interact magnetically to pull the cleaning apparatus toward the horizontally curved metal tower, but the magnet is not close enough to touch the horizontally curved metal tower when the slider or wheel is in contact with the horizontally curved metal tower.

16 Claims, 4 Drawing Sheets

(56) References Cited

U.S. PATENT DOCUMENTS

| | | |
|---|---|---|
| 8,347,899 B2 | 1/2013 | Jensen et al. |
| 8,347,900 B2 | 1/2013 | Jensen et al. |
| 8,544,484 B2 | 10/2013 | Jensen et al. |
| 2005/0042102 A1 | 2/2005 | Teichert |
| 2006/0054202 A1 | 3/2006 | Luke et al. |
| 2006/0175465 A1 | 8/2006 | Teichert |
| 2007/0056801 A1 | 3/2007 | Iversen |
| 2007/0283984 A1 | 12/2007 | Fratello et al. |
| 2009/0020361 A1 | 1/2009 | Teichert |
| 2009/0169734 A1 | 7/2009 | Teichert |
| 2010/0018551 A1 | 1/2010 | Gallegos |
| 2010/0132137 A1 | 6/2010 | Eggleston |
| 2010/0132738 A1 | 6/2010 | Kumar et al. |
| 2011/0088723 A1 | 4/2011 | Jensen et al. |
| 2011/0318496 A1 | 12/2011 | Jensen et al. |
| 2013/0122210 A1 | 5/2013 | Jensen et al. |
| 2013/0122211 A1 | 5/2013 | Jensen et al. |
| 2017/0051726 A1* | 2/2017 | Mondejar Ruiz-Romano ............. F03D 13/20 |

OTHER PUBLICATIONS

International Search Report dated Jan. 19, 2012 for PCT/US2011/041662, Applicant Dustin Jensen et al.
International Search Report dated Sep. 15, 2011 for PCT/US2010/061595, Applicant Dustin Jensen et al.

* cited by examiner

CLEANING APPARATUSES

BACKGROUND

Wind turbines are increasing in prominence and popularity as a source of clean energy production. Wind currents can cause blades of a wind turbine to rotate, converting the kinetic energy of the rotating blades into usable electrical or mechanical energy.

Wind turbines are often erected in areas having few obstacles obstructing wind currents to maximize a potential energy output. Such areas are sometimes remote and may be accessed only by traversing poorly maintained roads. This can present some difficulty in accessing the wind turbine for maintenance and other operations. Various types of maintenance may be performed on wind turbines. Maintenance of outer components of the wind turbines, such as the wind turbine blades or the surface of the wind turbine tower, becomes increasingly difficult as a size of wind turbines increases in attempts to generate more energy.

Repairs and cleaning are some of the more common maintenance issues facing owners of wind turbines. Maintenance of wind turbines often involves periodic lifting or lowering of wind turbine parts, equipment, maintenance personnel, etc. Some specific examples of maintenance operations involving lifting or lowering of objects include inspection of the wind turbine blades, cleaning the wind turbine blades and tower, replacement of parts, such as wind turbine blades, etc.

Prior maintenance systems have generally utilized freestanding cranes or other forms of lifts to lift and/or lower objects in connection with maintenance or repair of outer components of wind turbines. However, due to the difficulty in accessing wind turbines because of location, transportation of the cranes or lifts to the wind turbines can be difficult, costly, and time consuming.

Wind turbine cleaning is generally performed on a periodic or regular basis. Cleaning wind turbine blades and tower supports can be useful for a variety of purposes, such as maintaining an efficiency of the wind turbine, extending a useful life of the blades and towers, maintaining a clean, well-maintained appearance, etc. Wind turbines are sometimes cleaned as frequently as two or more times per year.

Over relatively short periods of use (such as a matter of weeks or months), wind turbines blades and towers can become defiled by dust, coatings of salt, dead insects, bird excrement and other surface deposits. Wind turbine defilement can reduce the efficiency, worsen an appearance, and lead to corrosive and other detrimental effects on the wind turbine surfaces.

Because of various factors such as the size and location of wind turbines, cleaning and other maintenance can be a difficult and time-consuming process. Further, wind turbine maintenance can be hazardous for maintenance workers. Accordingly, there is a need for wind turbine cleaning and maintenance which is simpler, faster, and which allows for a safer and more stable condition for maintenance workers.

DETAILED DESCRIPTION

Figure 1:
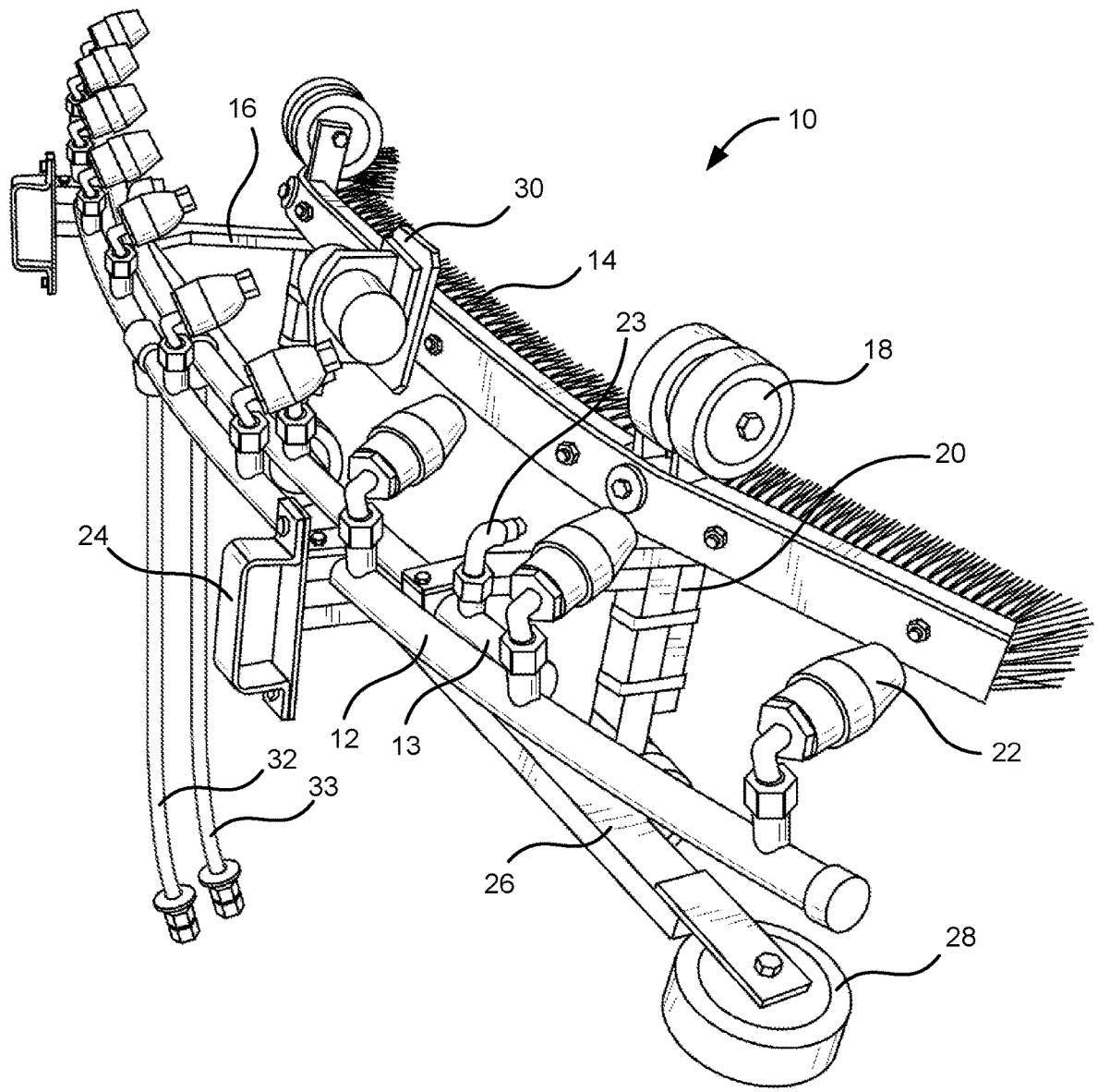
FIG. 1 is a perspective view of an example cleaning apparatus in accordance with the present disclosure.

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

Wind turbine maintenance and cleaning has been typically carried out by using large cranes and lift apparatuses. However, as has been described, the use of such devices can present difficulties in terms of access, expense, etc. Other systems have been used which attempt to reduce difficulties of access by removing or reducing the need for transporting large and heavy equipment to wind turbine sites. For example, skilled climbers may use ropes to traverse a side of a wind turbine tower or blade. However, a lack of climbing experience can be hazardous to maintenance workers and some issues with maintenance and repair are not easily addressed by an individual on a rope on the side of the wind turbine tower. Particularly when large or heavy parts are involved for installation, repairs, etc., an individual on a rope may have significant difficulty in performing the maintenance operations. Another system for maintenance and cleaning involves the installation of a crane and a cable basket underneath the nacelle of the wind turbine which allows the basket to be lowered down the side of the wind turbine. However, the basket can be difficult to position correctly and difficult to work from due to an unstable nature.

Regardless of the approach to maintenance and cleaning, many systems have still involved significant manual labor. To the extent there are cleaning apparatuses available for use, they tend to be bulky and require a lot of work to set up or a lot of manpower to operate.

To reduce a cost, cleaning time, difficulty, and hazardousness of wind turbine cleaning, a wind turbine tower cleaning apparatus is provided in accordance with an example of the present disclosure. For example, a cleaning apparatus suitable for cleaning a horizontally curved metal tower, such as a wind turbine tower or other large metal tower, can include a fluid directing channel configured to receive pressurized fluid from a fluid source; a slider or wheel positioned to contact and vertically traverse the horizontally curved metal tower; and a standoff which separates the fluid directing channel spatially from the slider or wheel. The apparatus can also include sprayer nozzles fluidly coupled to the fluid directing channel which can be directed toward or beyond the slider or wheel, i.e. toward the tower when in place. A magnet can also be positioned on the apparatus and configured to interact magnetically to pull the cleaning apparatus toward the horizontally curved metal tower, but also positioned so that the magnet does not touch the horizontally curved metal tower when the slider or wheel is in contact with the horizontally curved metal tower.

In another example, a cleaning apparatus suitable for cleaning a horizontally curved metal tower can include a fluid directing channel configured to receive pressurized fluid from a fluid source; a slider or wheel positioned to contact and vertically traverse the horizontally curved metal tower; and a standoff which separates the fluid directing channel spatially from the slider or wheel. The apparatus can further include sprayer nozzles fluidly coupled to the fluid directing channel that are directed toward or beyond the slider or wheel, i.e. toward the tower when in place. The cleaning apparatus can also include a brush for contacting the horizontally curved metal tower when the sliders or wheels are in contact with the horizontally curved metal tower, and an agitator vibrationally associated with the brush to cause the brush to vibrate when cleaning the horizontally curved metal tower. With respect to the sprayer nozzles, they can additionally or alternatively be aimed near the brush so that pressurized fluid contacts the tower near where the brush contacts and cleans the tower.

In each of these examples, the various features can be combined together in examples that include the magnet, the brush, and/or the agitator. The horizontally curved metal surface can be a wind turbine tower, and the cleaning apparatus can have a shape suitable for tracking along the wind turbine tower in a vertical direction. In another example, a frame can also be included that supports the fluid directing channel and the standoff. The pressurized fluid can be water, a rinsing solution, a cleaning solution including a cleaning solute, a cleaning chemical fluid, and in some examples, there can be at least two sets of nozzles, each set having independent fluid circuitry for feeding the two sets of nozzles with two different types of fluid, respectively.

In another example, a method of cleaning a horizontally curved metal tower can include magnetically associating a cleaning apparatus with a horizontally curved metal tower; vertically traversing the cleaning apparatus along the horizontally curved metal tower; and ejecting fluid from the cleaning apparatus onto the horizontally curved metal tower as the cleaning apparatus is vertically traversing the tower. The vertical traversing may include both upward traversing (ascending) and downward traversing (descending) in a direction along the height of the tower. In one example, during the upward traversing, a first fluid may be ejected onto the horizontally curved metal tower, and during the downward traversing, a second fluid may be ejected onto the horizontally curved metal tower. For example, the first fluid may water and the second fluid may be a chemical treatment fluid including soap or other chemical used in the automatic wash industry. Alternatively, the second fluid may water and the first fluid may be a chemical treatment fluid including soap or other chemicals used in the automatic wash industry. Upward traversing may be first and downward traversing may be second, or vice versa.

In another example, the vertically traversing step may be carried out using a lifting line having a first end portion, wherein the lifting line attached to the cleaning apparatus at the first end portion. The vertical traversing can be controlled from the lifting line at a location distal to the first end portion. For example, the location distal to the first end portion may be a second end portion that is attached to a winch, hoist, or other mechanical lifting mechanism. The terms "first end portion" and "second end portion" does not necessarily mean they are at the very ends of the lifting line, but rather are closer to their respective ends relative to one another. In one example, the lifting line may also include a middle portion that is associated with a line support positioned at a location above the cleaning apparatus to change a direction of the force between the first end portion and the second end portion. Again, the "middle portion" is only middle relative to the first end portion and the second end portion, and does not mean it is at the absolute middle of the lifting line. With respect to the term "lifting line," this can be any material used to lift the cleaning apparatus, such as rope, cable, chain, woven line, mesh line, etc. With respect to the term "line support," this structure can be a pulley or a low friction open structure, e.g., a ring, a loop, a carabiner, etc., By "low friction" what is meant is that the open structure is of a material that easily allows the lifting line to pass therethrough or thereby without damaging the lifting ling. Such a structure functions similarly as a pulley wheel, but does not rotate.

In one specific example, the horizontally curved metal tower can be a wind turbine tower having a rotatable nacelle at a top of the wind turbine tower, and the lifting line can be also associated with the nacelle at the location distal to the first end portion such that the lifting line moves the cleaning apparatus laterally around the wind turbine tower when the nacelle is turned.

It is noted that in describing the apparatuses, systems, and methods herein, some emphasis is placed on chemically cleaning and/or pressure rinsing the tower. This is done for purposes of clearly describing one example of the apparatus, and not to disclaim embodiments where each fluid is not specifically described. Thus, it is noted that in each case where cleaning is described, painting or surface treating embodiments are expressly considered to be disclosed and included in such discussions. Any minor modifications that could be used to accomplish this are included herein, and may include, for example, replacing the cleaning solution/chemical treatment and/or water with paint or other surface treatment composition, modifying hosing or sprayers to facilitate the use of a different fluid (paint sprayers used rather than cleaning sprayers), modifying positioning of sprayers to enable appropriate coverage, etc. Such modifications would be apparent to one skilled in the art after considering the present disclosure.

Figure 2:
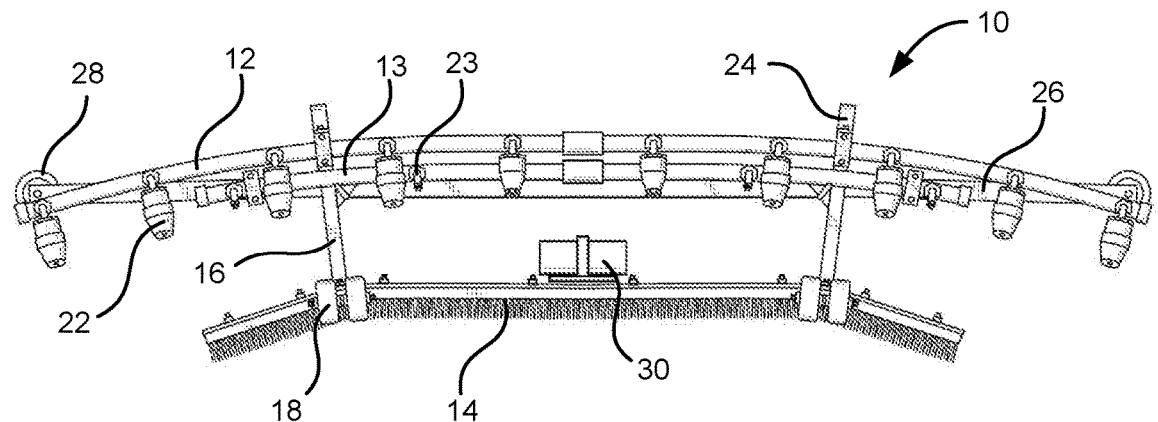
FIG. 2 is a top view of an example cleaning apparatus in accordance with the present disclosure.
Figure 3:
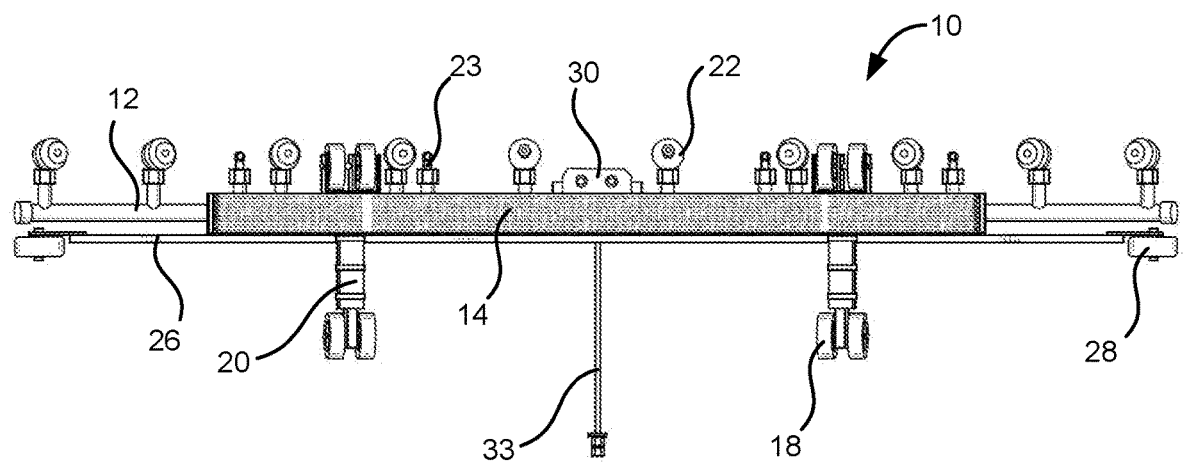
FIG. 3 is a front view of an example cleaning apparatus in accordance with the present disclosure.

Turning now to FIGS. 1-3, various views of an example cleaning apparatus is shown at 10. Not every structure of the cleaning apparatus in each of the three figures is visible because some structures may be hidden, depending on the view. Thus, as shown collectively in FIGS. 1-3, the cleaning apparatus may include a first fluid directing channel 12, and in some examples, a second fluid directing channel 13. The first fluid directing channel in this example can be configured for directing water or other high pressure rinse solution from a first connecting hose 32 to a first set of sprayer nozzles 22. The second fluid directing channel in this example can be configured for directing a wash solution or chemical treatment solution from a second connecting hose 33 to a second set of sprayer nozzles 23. The sprayer nozzles of whatever type are pointed toward or just above or below (or just beyond) a brush 14 and/or tracking wheels 18, for example. In this example, the brush is a curved brush that has a curvature that may similarly and inversely match the contour of the horizontally curved metal tower (now shown here, but shown in FIGS. 4 and 5). The curved brush can be flexible or adjustable so as to be versatile for various tower curvatures, in some examples. The tracking wheels (or sliders, in some examples, which may have a low coefficient of friction and can slide along the surface of the tower without damaging the tower) can roll along the tower to provide contact and tracking between cleaning apparatus and the tower. The sprayers may also be pointed toward or aimed to hit just beyond the wheels as well. In this particular device, it is only the wheels and the brush that will touch the tower while the cleaning apparatus is climbing or descending the tower. Notably, there are examples where the brush may not be present. In these examples, the sprayers may provide enough fluid pressure to adequately clean or otherwise coat the tower. As the wheels and the brush are in contact with the tower in this example, and as the sprayers may be separated to some degree away from the tower, a standoff 16 is used in this example to provide this structural separation. In this instance, it is a pair of rigid bars of an appropriate length suitable to provide a desired separation appropriate for the spray pattern and fluid pressure can be used.

To provide good contact between the cleaning apparatus 10 and the tower (not shown), magnets 20 are positioned in this example between the two pair of tracking wheels 18. The magnets are fixed on the apparatus at a location close to the tower (when the wheels are contacting the tower), but the magnet is not contacting the tower. As the cleaning apparatus can be fairly heavy, e.g., from 30 to 200 pounds or from 50 to 80 pounds, for safety, the magnet strength and proximity of the magnet to the tower can provide enough magnetic pull to hold the cleaning apparatus against the tower as it vertically climbs and descends the tower. With only the wheels and the brush 14 contacting the tower, the strength of the magnetic pull can be relatively light, but in some examples may also be very strong, provided the tracking wheels can track vertically along the tower. If low friction sliders are used rather than wheels, a very strong magnet may not be as suitable for use.

To generate vertical travel, the cleaning apparatus can include one or more lifting line attachment point 24. The lifting line, not shown here but shown in FIGS. 4 and 5, can be attached to both lifting line attachment points and may come together to a single lifting line to form an inverted Y shape. Using two lifting line attachment points provides added stability to the apparatus, which is also supplemented by the tracking wheels and magnet(s). The lifting line attachment points in this example is on the back portion of the cleaning apparatus 10 which also contributes to a forward force between the wheels 18 and the tower (not shown), adding still further stability. In one example, the line attachment points can be attached to a frame 26 which can also be used to attached several other of the various structural features together, including the fluid directing channels 12, 13, the standoff 16, as well a safety bumper or safety wheel 28. This safety bumper or safety wheel does not contact the tower during normal use, but is present to protect the tower from damage if for some reason the cleaning apparatus separates from the tower.

Continuing with FIGS. 1-3, to provide additional cleaning assistance to the brush 14, the cleaning apparatus 10 may also include an agitator that is vibrationally associated with the brush. This can be a battery operated vibrating agitator that causes the brush to vibrate or move in small fast patterns to assist the brush with its cleaning action. The vibration can be vigorous enough to cause the brush bristles to move along with the agitator in a manner independent of the vertical travel of the cleaning apparatus. Any vibrating agitator can be used, provided it has a vigorous enough vibration force to cause the brush to vibrate.

Figure 4:
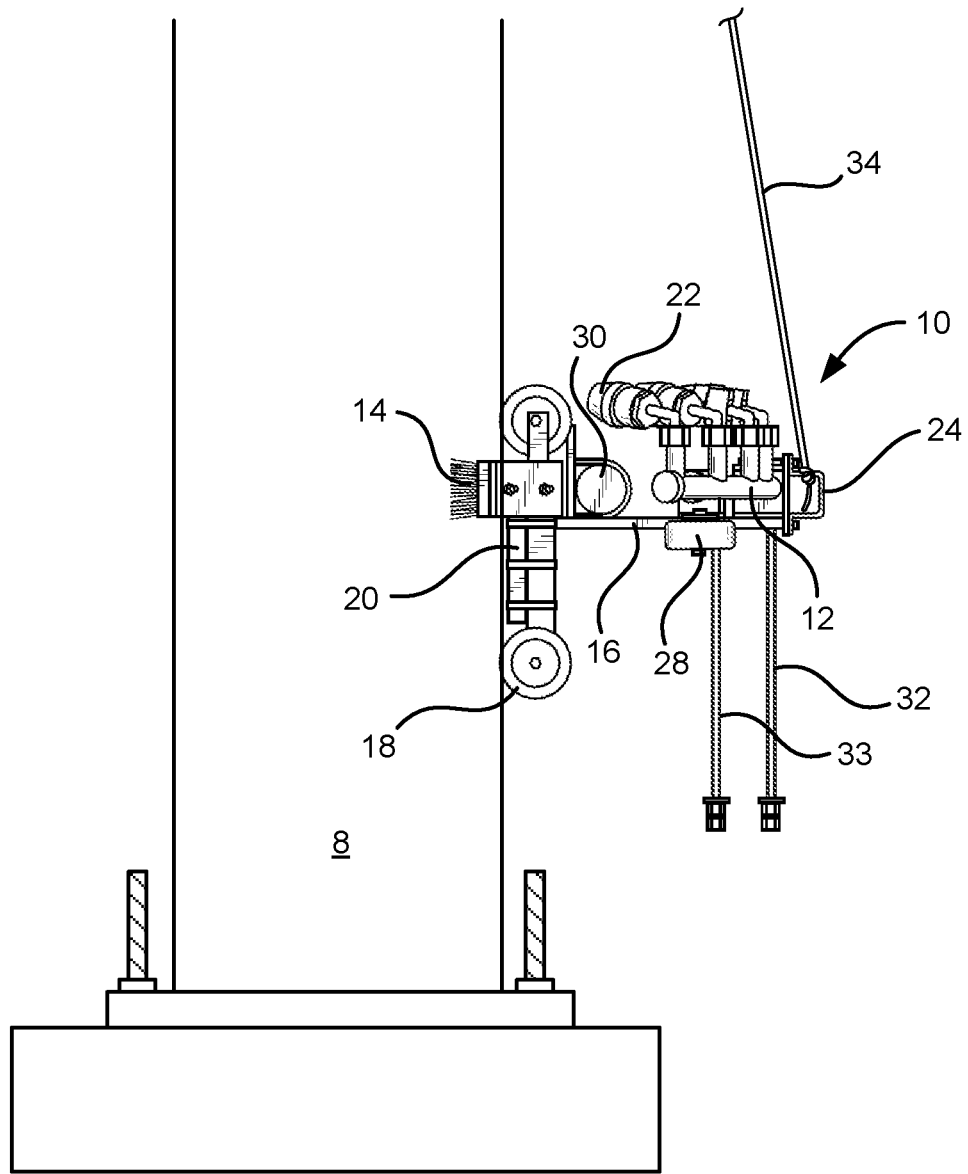
FIG. 4 is a side view of an example cleaning apparatus positioned on a horizontally curved metal structure in accordance with the present disclosure.

Referring now to FIG. 4, a cleaning apparatus, indicated generally at 10, is shown that is suitable for cleaning or generally applying fluids to a horizontally curved metal tower 8, such as a wind turbine tower. The term "horizontally curved" refers to the curvature of the tower in the horizontal direction, meaning a horizontal cross-section of the tower would reveal a curved surface. A wind turbine tower is a good example of a horizontally curved metal tower because it has an essentially round cross section, and is tapered from a larger round cross section toward the bottom to a smaller round cross section toward the top. Some horizontally curved metal towers may be uniform in cross section throughout the entire height. Regardless, any tower that has a curved surface along a horizontal plane (round, oval, parabolic, bowed, etc.) is considered horizontally curved.

Returning now to FIG. 4, the cleaning apparatus 10 is shown as it is positioned on the tower 8. A lifting line 34 (attached to a line attachment point 24) is used to both elevate and lower the cleaning apparatus vertically along the tower. In this example, tracking wheels 18 track along the tower and a brush 14 associated with an agitator 30 work together to scrub the tower surface. A magnet 20 is used to pull the entire cleaning apparatus toward the tower while the wheels track vertically, and sprayers 22, which are positioned away from the tower via a standoff 16, are pointed toward the tower for cleaning. The sprayers are fed by a fluid directing channel 12 and a feed hose 32. Feed hose 33 is also shown which feeds a second fluid directing channel (not shown) and a second set of sprayers (not shown). A safety bumper or safety wheel 28 is also shown in this example, which has no function during normal operation, but becomes useful if the cleaning apparatus becomes separated from the tower and inadvertently turns sideways.

Figure 5:
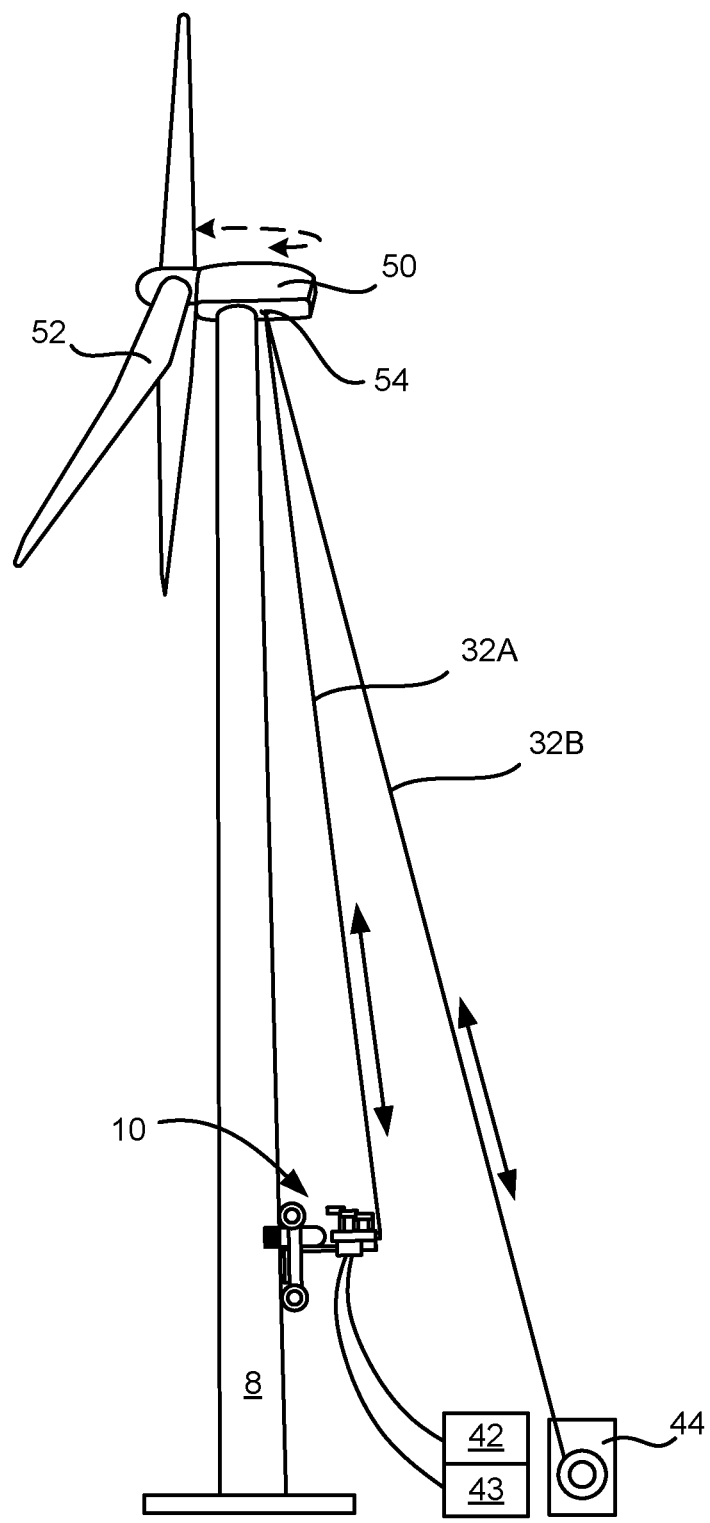
FIG. 5 is a side view of an example cleaning apparatus positioned on a wind turbine tower in accordance with the present disclosure.

If the horizontally curved metal tower is a wind turbine tower, such as that shown in FIG. 5, the towers may be tens of feet in diameter at the base. Thus, the brush configuration can be inversely matched to such diameters, or can be flexible or spring loaded to adjust when experiencing a taper toward the top of the wind turbine tower, but this is not required.

The cleaning apparatus 10 can be constructed from any suitable material. For example, wood, plastic, metal, fiberglass, etc. may be used to construct the frame, fluid directing channels, standoff, etc. In one aspect, to provide a sturdy, strong, rigid construction, metal may be used. In one aspect, the metal used to construct the frame, standoff, or other solid support structures (e.g., tracking wheel supports) may be steel or a steel alloy. Other metal materials or non-metal materials may also be used. In one aspect, the apparatus can be constructed by welding and/or bolting a plurality of parts or pieces together to form an integrated cleaning apparatus. The apparatus may be constructed so as to circumferentially extend partially around the tower 8, but not fully around the tower. In one example, the apparatus may clean up to one third of the circumference at a time, e.g., from 5% of the circumference (including the vertical line associated therewith) to 33% of the circumference. In another example, from 5% to 25% of the circumference of the tower can be cleaned per vertical pass (or ascending/descending passes). To illustrate one specific example, the cleaning apparatus may be configured to move vertically in one direction (ascending or descending) while a chemical cleaner is applied from one set of sprayers, and then move vertically in the other direction while power rinsing the tower from another set of sprayers.

In further detail regarding the standoff 16, as mentioned, positioning the fluid directing channels at a predetermined distance away from the tower can enable the sprayers to spray fluid over a larger area of the tower compared to if the sprayers were directly adjacent (or too close) to the wind turbine tower. In one aspect, the length of the standoff can be determined according to a swath of fluid spray from the sprayer(s) In other words, the standoff configuration can be determined according to an optimal or desired spraying distance for the sprayers. At too large of a length, the standoff may result in not applying a sufficient amount of fluid from the sprayer to the tower or perhaps the sprayer may not be able to adequately spray the fluid onto the tower. Too small of a length may result in not providing the coverage of fluid on the tower as may be desired or may lead to an increase the number of sprayers around the frame, thus increasing a cost. With the presence of the agitator, the distance of the sprayer becomes less of an issue in some examples, as the brush can compensate for some improperly positioned sprayers.

Turning now to FIG. 5, which is a specific example where the horizontally curved metal tower 8 is a wind turbine tower, as shown, the wind turbine tower is used to support wind turbine blades 52, which are attached to a nacelle 50. The nacelle can be rotated using a motor that is present in the wind turbine portion of the tower. In this example, the cleaning apparatus 10 is attached to a lifting line at a first end portion 32A and a winch 44 at a second end portion 32B. Therebetween along the lifting line is a middle portion that is associated (slidably or rollably) with a lifting line support 54, which can be a ring, pulley, hook, carabiner, etc. Thus, by engaging the winch in a winding or releasing motion, the cleaning apparatus can ascend or descend the tower, respectively. After climbing and/or ascending, the cleaning apparatus can be repositioned laterally around the wind turbine tower by rotating the nacelle. For example, the cleaning apparatus may be rotated incrementally around a tower after each vertical section is cleaned. Thus, the apparatus may be used multiple times on the tower to effect cleaning of multiple face portions of the tower circumference. The cleaning apparatus may likewise be raised and lowered along the height of the wind turbine tower by any other method. For example, a hoist can be attached to the top of the tower, such as at the nacelle of a wind turbine tower. The hoist can then be rotated as well by rotating the nacelle, thus causing the cleaning apparatus to also rotate around the circumference of the tower.

The sprayers can be fluidly coupled to a pressurized fluid source. In this example shown in FIG. 5, there may be two pressurized fluid containers that feed the cleaning apparatus 10. For example, water may be fed to one circuit of sprayers from fluid source 42, and a chemical cleaning solution may be fed to another circuit of sprayers from fluid source 43. The sprayers may comprise any suitable spraying device capable of spraying a desired fluid onto the tower 8. The sprayers illustrated in FIGS. 1-3 are positioned to provide spray clearance above or below the brush in a direction toward the tower just beyond the wheels and brush. However, the sprayers may alternatively comprise any desired configuration and may spray fluid from any desired position with respect to the brush, wheels, etc., or at any desired direction towards the tower. In one aspect, the apparatus may be implemented with a single sprayer, but due to a size of the circumference of the wind turbine tower, a single sprayer may not adequately spray fluid to an entire portion of the tower surface. Typically, the apparatus may comprise a sufficient number of sprayers that a vertical tower portion can be sufficiently sprayed with fluid in one or two passes (up and/or down the wind turbine tower) along a line that corresponds with the effective cleaning width of the cleaning apparatus.

The sprayers can alternatively be interconnected such that all of the sprayers of a circuit receive fluid from a same fluid supply. For example, the sprayers of a single circuit can all be fed by the same fluid directing channel. Again, fluid may be supplied to the fluid directing channel through a hose. In one aspect, fluid reservoirs may be provided by one or more fluid tank carried by a utility vehicle to the site of the wind turbine tower. The fluid hose can attach to the fluid directing channel at a hose attachment section. The hose attachment section can securely attach the hose to the fluid directing channel to supply fluid to the sprayers, even when the frame is raised high up against the tower. The fluid hose or hoses can typically be long enough to reach the top of the tower. If multiple fluid circuits are present, multiple hoses and fluid supplies can be used as previously described.

In one aspect, the sprayers can be configured to spray a cleaning or treatment solution, or even a tower surface sealing solution or paint. In another aspect, the sprayers can be configured to spray a high pressure rinse, such as a water rinse or other dilute rinsing solution, onto the tower surface. In another example embodiment, the sprayers can spray a cleaning or treatment solution while the apparatus is raised along a height of the tower and the sprayers can spray a rinse while the frame is lowered along the height of the tower to rinse off the cleaning solution (or vice versa with respect to raising and lowering). In this manner, an entire path or vertical section of the wind turbine tower surface may be cleaned in a single up-down cycle of raising and lowering the apparatus (or lowering and raising). After a vertical section is cleaned, as mentioned, the cleaning apparatus can be moved by rotating the nacelle to reposition the apparatus an adjacent cleaning vertical section for the process to be repeated. Thus, an entire wind turbine tower can be cleaned in a matter of hours in a simple manner, and can be carried out with only one or two workers, for example (when the system is not automated), as opposed to the days or weeks spent cleaning using some previous cleaning methods.

While the above examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A cleaning apparatus suitable for cleaning a horizontally convex metal tower, comprising:
   a fluid directing channel configured to receive pressurized fluid from a fluid source;
   two sets of sliders or wheels positioned to contact and vertically traverse the horizontally convex metal tower, wherein the two sets of sliders or wheels comprises a first set of sliders or wheels and a second set of sliders or wheels, wherein the first set of sliders or wheels comprises a first upper wheel or a first upper slider and a first lower wheel or a first lower slider, and wherein the second set of sliders or wheels comprises a second upper wheel or a second upper slider and a second lower wheel or a second lower slider;
   multiple standoffs which separates the fluid directing channel spatially from the two sets of sliders or wheels;
   sprayer nozzles fluidly coupled to the fluid directing channel, the sprayer nozzles directed toward or beyond the two sets of sliders or wheels;
   a brush to clean or contact the horizontally convex metal tower when the two sets of sliders or wheels are in contact with the horizontally convex metal tower;
   an agitator vibrationally associated with the brush to cause the brush to vibrate when cleaning the horizontally convex metal tower; and a pair of magnets positioned on the apparatus that are horizontally separated from one another such that the pair of magnets are individually located closer to an end of the brush than they are to one another, wherein the magnets are configured to interact magnetically to pull the cleaning apparatus toward the horizontally curved metal tower but not close enough to touch the horizontally curved metal tower when the two sets of sliders or wheels are in contact with the horizontally curved metal tower, wherein when the cleaning apparatus is vertically moving along the length of a tower while performing cleaning, a first magnet of the pair of magnets is positioned vertically between the first upper wheel or the first upper slider and the first lower wheel or the first lower slider, and wherein when the cleaning apparatus is vertically moving along the length of a tower while performing cleaning, a second magnet of the pair of magnets is vertically positioned between the second upper wheel or the second upper slider and the second lower wheel or the second lower slider.

2. The cleaning apparatus of claim 1, wherein the horizontally convex metal surface is wind turbine tower, and wherein the cleaning apparatus has a shape suitable for tracking along the wind turbine tower in a vertical direction.

3. The cleaning apparatus of claim 1, further comprising a frame which supports the fluid directing channel and the standoffs.

4. The cleaning apparatus of claim 1, wherein the pressurized fluid is water.

5. The cleaning apparatus of claim 1, wherein the pressurized fluid includes a cleaning chemical.

6. The cleaning apparatus of claim 1, wherein the sprayer nozzles include at least two sets of nozzles, each set having independent fluid circuitry for feeding the two sets of nozzles with two different types of fluid, respectively.

7. The cleaning apparatus of claim 1, wherein each of the two sets of sliders or wheels are located closer to a respective end of the cleaning apparatus than they are to each other.

8. A method of cleaning a horizontally convex metal tower, comprising:
arranging the cleaning apparatus of claim 1 on the horizontally convex metal tower such that the magnets attract the cleaning apparatus toward the tower;
vertically traversing the cleaning apparatus along the horizontally convex metal tower;
ejecting fluid from the cleaning apparatus onto the horizontally convex metal tower as the cleaning apparatus is vertically traversing; and
brushing a surface of the horizontally convex metal tower while vertically traversing the cleaning apparatus while agitating the brush.

9. The method of claim 8, wherein the vertical traversing includes both upward and downward traversing.

10. The method of claim 9, wherein during the upward traversing, a first fluid is ejected onto the horizontally curved metal tower, and during the downward traversing, a second fluid is ejected onto the horizontally curved metal tower.

11. The method of claim 10, wherein the first fluid or the second fluid is water, and the other of the first fluid or the second fluid is a chemical treatment fluid.

12. The method of claim 8, wherein the vertically traversing is carried out using a lifting line having a first end portion, the lifting line attached to the cleaning apparatus at the first end portion, and wherein the vertical traversing is controlled from the lifting line at a location distal to the first end portion.

13. The method of claim 12, wherein the location distal to the first end portion is a second end portion that is attached to a winch or a hoist.

14. The method of claim 13, where the lifting line also includes a middle portion that is associated with a line support positioned at a location above the cleaning apparatus to change direction of the force between the first end portion and the second end portion.

15. The method of claim 14, wherein the line support comprises a pulley or a low friction open structure.

16. The method of claim 12, wherein the horizontally curved metal tower is a wind turbine tower having a rotatable nacelle at a top of the wind turbine tower, and wherein the lifting line is also associated with the nacelle at a location distal to the first end portion, and wherein the lifting line moves the cleaning apparatus laterally around the wind turbine tower when the nacelle is turned.

* * * * *